United States Patent [19]

Prato et al.

[11] Patent Number: 5,039,126
[45] Date of Patent: Aug. 13, 1991

[54] DEVICE FOR LIMITING THE COLLAPSE OF A VEHICLE STRUCTURE ON FRONTAL IMPACT

[75] Inventors: Luigi Prato, Villarbasse; Luigi Filtri, Torino, both of Italy

[73] Assignee: Fiat Auto S.P.A., Torino, Italy

[21] Appl. No.: 452,741

[22] Filed: Dec. 21, 1989

[30] Foreign Application Priority Data

Dec. 23, 1988 [IT] Italy .................. 68149 A/88

[51] Int. Cl.⁵ .............................................. B60R 22/46
[52] U.S. Cl. .................................... 280/750; 280/777; 296/189
[58] Field of Search ................. 296/189; 280/749, 750, 280/777

[56] References Cited

U.S. PATENT DOCUMENTS

| | | | |
|---|---|---|---|
| 1,959,974 | 5/1934 | Westgate | 280/749 |
| 3,011,823 | 12/1961 | Maher | 280/750 |
| 3,627,345 | 12/1971 | LeMire | 280/750 |
| 4,795,189 | 1/1989 | Vollmer et al. | 280/750 |
| 4,884,652 | 12/1989 | Vollmer | 280/777 |

FOREIGN PATENT DOCUMENTS

| | | |
|---|---|---|
| 3627558 | 12/1987 | Fed. Rep. of Germany . |
| 3642437 | 3/1988 | Fed. Rep. of Germany . |
| 3703021 | 8/1988 | Fed. Rep. of Germany . |
| 3710808 | 10/1988 | Fed. Rep. of Germany . |

*Primary Examiner*—Richard A. Bertsch
*Attorney, Agent, or Firm*—Shlesinger, Arkwright & Garvey

[57] ABSTRACT

The device consists of a moderately pretensioned wire cable which connects the opposing vehicle body sides together. The cable is fixed by means of a pair of opposing reinforcement plates of relatively large surface area that are welded and/or screwed to the vehicle body. The cable passes about the steering column in such a manner as to limit its rearward movement in case of a frontal impact between the vehicle and an obstacle and/or another vehicle and to simultaneously limit the movement of the body sides away from each other.

6 Claims, 1 Drawing Sheet

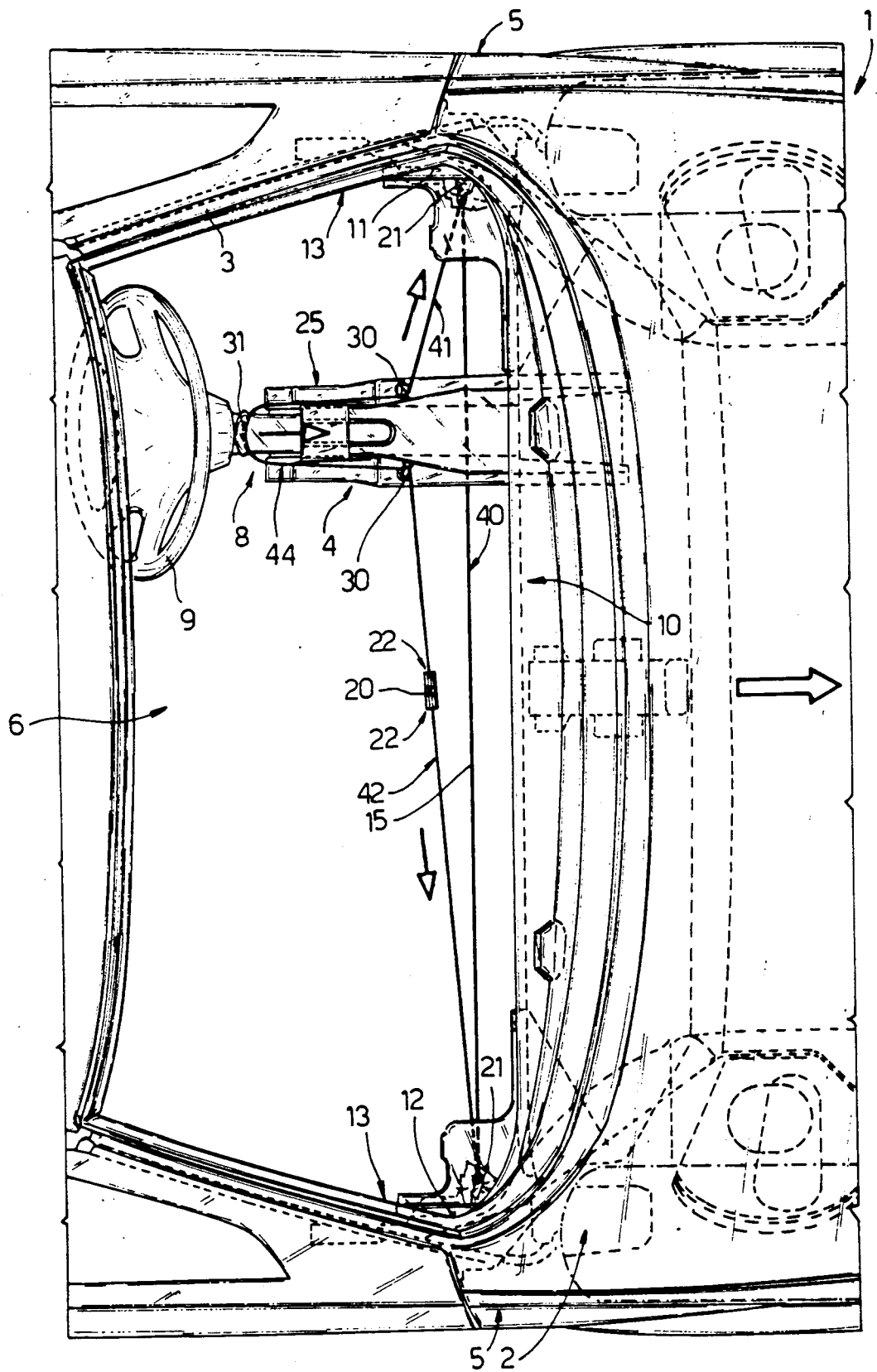

DEVICE FOR LIMITING THE COLLAPSE OF A VEHICLE STRUCTURE ON FRONTAL IMPACT

BACKGROUND OF THE INVENTION

This invention relates to a device for limiting the collapse of a vehicle structure on frontal impact, and in particular for limiting the movement of the body sides away from each other while at the same time also limiting the rearward movement of the steering column into the vehicle passenger compartment. Currently, vehicle body sides are connected together at their front by a cross-member of box structure, the opposing ends of which are welded or bolted directly to the body sides and/or to support brackets rigidly provided on the inner surfaces of the body sides. Such a structure has the drawback of being relatively weak if the vehicle suffers frontal impact. In such a case, the stresses produced by the impact result in simultaneous tensile and torsion/shear stressing of the cross-member. In particular, the torsion and shear stresses are a maximum precisely at the points at which the cross-member is connected to the body sides, and this, in the case of particularly violent impact, can produce the partial or indeed total separation of the cross-member from the body sides by fracture of the weld spots and/or of the other connection means used, and also because generally the cross-member is fixed to the body sides by a relatively small number of weld spots and/or bolts, especially if little space is available thus making the joining operations difficult and limiting the reliability and quality of the welds made.

It is also known, for example from German patent application No. 3627558, to limit the rearward movement of the steering column on frontal impact by connecting the steering column by a cable to the engine-gearbox unit so that the rearward movement of the engine-gearbox unit on impact produces a forward pull on the steering column. However, such an arrangement is not always useful in the case of impact, particularly if the dynamics of the impact are such as to produce only a limited (or zero) movement of the engine-gearbox unit, but at the same time a much greater movement of the steering column.

SUMMARY OF THE INVENTION

The object of the invention is to provide a simple, efficient and economical device for limiting the collapse of a vehicle structure on frontal impact, which is particularly able to limit the movement of the vehicle body sides away from each other, even if they become separated from the connecting cross-member.

The object is attained according to the invention by a device for limiting the collapse of a vehicle structure on impact, particularly on frontal impact, the structure comprising a pair of opposing body sides forming part of the vehicle body and laterally bounding the vehicle passenger compartment, and a steering column disposed parallel to the body sides, characterised by comprising a pair of reinforcement plates, each of which is rigidly fixed against a respective inner surface of a respective said body side, and a metal cable extending tautly transversely to the passenger compartment and rigidly connecting the reinforcement plates together.

BRIEF DESCRIPTION OF THE DRAWING

The invention will be more apparent from the description of one embodiment thereof given hereinafter by non-limiting example with reference to the accompanying drawing, which represents a diagrammatic plan view of a vehicle provided with the device according to the invention.

DETAILED DESCRIPTION OF THE INVENTION

In the drawing, the reference numeral 1 indicates overall a vehicle, in this case a motor vehicle, the structure 2 of which comprises a body, of which a pair of opposing body sides 5 from a part, and a steering column 4 disposed parallel to the body sides 5. The pair of body sides 5 laterally bound a passenger compartment 6 of the vehicle 1, into which the steering column 4 projects by an end 8 provided with a steering wheel 9. According to the invention, the body sides 5 and the steering column 4 are interconnected by a device 10 arranged to limit the collapse of the structure 2, particularly in the case of frontal impact of the vehicle 1 against an obstacle and/or other vehicle. The device 10 comprises a pair of reinforcement plates 11 and 12, each of which is rigidly fixed against a respective inner surface 13 of a respective body side 5, and a metal cable 15 taut transverely to the passenger compartment 6, and rigidly connecting the reinforcement plates 11 and 12 together. The plates 11 and 12 are of relatively large dimensions and are shaped so as to be able to be fixed easily to the body sides 5 by welding, using a high number of weld spots, being made possible by the fact that there is no cross-member connecting the body sides 5 together. According to a preferred embodiment of the invention the cable 15 is connected to the reinforcement plates 11 and 12 in moderately pretensioned manner, so that when under rest conditions, it is under a predetermined tensile stress. For this purpose, for example, the device 10 can comprise tensioning means 20 of any known type, indicated diagrammatically merely as a block on the drawing, and connected mechanically in series with the cable 15. The cable 15 is inserted through respective fixing brackets 21, each rigid with a respective reinforcement plate 11, 12 and terminates as an endless loop at the tensioning means 20, which connect together the two ends 22 of the cable 15, this being preferably formed of wire strands.

According to the invention, the cable 15 engages not only with the brackets 21 but also engages respective fixing means 25 which is rigid with the steering column 4 by passing in the manner of a loop about this latter. Specifically, the fixing brackets 21 are disposed to the front of and in a position diametrically opposite the steering column fixing means 25, which comprise a pair of pulleys 30 fixed in mutually opposite positions to the side of the steering column 4, and a U-piece 31 fixed to the end 8 of the steering column 4 between the pulleys 30 and the steering wheel 9 and having its concavity facing the pulleys 30.

Consequently, in the device according to the invention the cable 15 is arranged in such a manner as to define in plan view a closed annular figure comprising a first straight branch 40 taut between the fixing brackets 21 for the reinforcement plates 11, 12 and conneciting together the opposing body sides 5, and second and third branches indicated respectively by 41 and 42, which are mutually oblique, opposite and asymmetrical, and extending taut between the fixing brackets 21, through which the cable 15 slidingly passes, and the pulleys 30, about which the branches 41 and 42 pass to form a common volute 44, which passes about the U-piece 31 so as to embrace the steering column in such a manner as to stress the cable 15, in particular the branch 40, should the steering column move towards the passenger compartment 6.

In use, should a frontal impact occur, the vehicle body 2 deforms such that the body sides 5 tend to move apart from each other to an extent which becomes progressively more pronounced in progressing towards the passenger compartment 6, and substantially a maximum precisely at the plates 11, 12. However, because of the presence of the device 10, this movement apart is totally prevented (or at least considerably limited) because the branch 40 of the loop formed by the cable 15 opposes this movement and retains the body sides in position, while it itself becomes subjected to tensile stress, with the result that the body sides can move only by the amount allowed by the elastic extension (or elastic-plastic if yield conditons are reached) of the cable 15, so totally limiting the collapse of the structure of the vehicle 1 while ensuring that at least part of the energy developed by the impact is absorbed, this being converted into deformation energy of the cable 15.

If the cable 15 is arranged as shown in the described example, i.e. wound about the steering column 5 as a loop, the cable 15 is also able to prevent, or at least limit, any rearward movement of the steering column 4 because the tensile stress induced in the branch 40 by the attempted movement of the body sides 5 results in tension in the branches 41 and 42 in the direction of the arrows, with the result that an axial thrust is exerted on the steering column 4 in the direction of the arrow, i.e. in the opposite direction to that produced by the impact, even if this impact has not produced sufficient energy to produce, for example the rearward movement of the vehicle engine-gearbox unit. In contrast, the thrust transmitted by the impact to the steering column 4 is also discharged to the cable 15 to produce in the branch 40 a stress which opposes the moving-apart of the body sides 5. Thus, with the illustrated arrangement of the cable 15, the impact stresses on the body sides 5 and steering column 4 are simultaneously discharged to the cable 15 and absorbed by the elastic deformation thereof, to limit or even prevent separation of the body sides 5 from the cross-members forming the load-bearing framework of the vehicle body 2. The cable 15 cannot become detached from the body sides 5 because, as the plates are connected only to a cable, i.e. to an element of very small bulk, they can be made suitably large and be fixed to the body 2 by a large number of weld spots (or connection members), so ensuring that local stresses on them are absorbed. These stresses are in any case limited by the fact that the cable 15 is a very flexible element, so that it transmits only limited shear and torsional forces to the body sides 5.

We claim:

1. A device for limiting the collapse of a structure of a vehicle during frontal impact, the vehicle comprising a body, a passenger compartment, and a steering column, the structure comprising a pair of opposing body sides forming a part of the body and laterally defining the passenger compartment, the steering column disposed parallel to the body sides, said device comprising:
    a) a pair of reinforcement plates, each of which is rigidly secured to an inner surface of the body sides that are likely to move away from each other in the event of a frontal impact; and
    b) a cable extending tautly across the passenger compartment in front of the steering column and secured to each of said reinforcement plates thereby to interconnect said reinforcement plates together so as to limit the movement of the body sides from each other during a frontal impact.

2. A device as in claim 1, wherein: a) said cable is pretensioned.

3. A device as in claim 1, wherein: a) said cable is metallic.

4. A device as in claim 1, and further comprising: a) means for tensioning said cable.

5. A device as in claim 1, and further comprising: a) a bracket rigidly connected to each of said reinforcement plates;
    b) means for securing said cable to the steering column;
    c) said brackets are disposed to the front of and diametrically opposite said securing means; and
    d) said cable is interconnected to said brackets and said securing means so as to form a closed loop.

6. A device as in claim 5, wherein said securing means comprises:
    a) a pair of pulleys each of which is secured to opposite sides of the steering column;
    b) a U-shaped member secured to one end of the steering column in the passenger compartment; and
    c) said cable is arranged such that said cable defines in plan view a closed loop having a first portion extending tautly between said brackets, second and third portions each extending tautly and obliquely between respective said brackets and said pulleys and a fourth portion engaging said U-shaped member and said pulleys.

* * * * *